United States Patent
Oh et al.

(10) Patent No.: US 8,021,779 B2
(45) Date of Patent: Sep. 20, 2011

(54) BATTERY SHEATH HAVING RADIATION LAYER FORMED THEREON AND LITHIUM POLYMER BATTERY USING THE SAME

(75) Inventors: Jeong Won Oh, Youngin-si (KR); Young Bae Sohn, Youngin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1173 days.

(21) Appl. No.: 11/253,053

(22) Filed: Oct. 17, 2005

(65) Prior Publication Data
US 2006/0083984 A1    Apr. 20, 2006

(30) Foreign Application Priority Data

Oct. 18, 2004   (KR) .................. 10-2004-0083275

(51) Int. Cl.
H01M 2/02     (2006.01)
H01M 10/50    (2006.01)
H01M 6/12     (2006.01)
H01M 6/46     (2006.01)
H01M 14/00    (2006.01)

(52) U.S. Cl. ........ 429/177; 429/120; 429/162; 429/163; 429/178; 429/7

(58) Field of Classification Search ............ 429/162, 429/163, 167, 176, 178, 7, 177, 120
See application file for complete search history.

(56) References Cited

U.S. PATENT DOCUMENTS

| 5,326,652 | A  | * | 7/1994  | Lake ............................. 429/127 |
| 5,382,479 | A  | * | 1/1995  | Schuster ....................... 429/112 |
| 6,177,209 | B1 | * | 1/2001  | Okutoh .......................... 429/62 |
| 6,337,153 | B1 | * | 1/2002  | Kodama et al. ............... 429/163 |
| 6,461,757 | B1 | * | 10/2002 | Sasayama et al. ............. 429/59 |
| 7,294,431 | B2 | * | 11/2007 | Puttaiah et al. ............... 429/163 |

FOREIGN PATENT DOCUMENTS

| JP | 11-297279    | 10/1999 |
| JP | 2001-176465  | 6/2001  |
| JP | 2001-176466  | 6/2001  |
| JP | 2002-056823  | 2/2002  |
| JP | 2003-036822  | 2/2003  |
| JP | 2003-257393  | 9/2003  |
| JP | 2003-288863  | 10/2003 |
| JP | 2003-297303  | 10/2003 |
| KR | 2000-0074812 | 12/2000 |

* cited by examiner

*Primary Examiner* — Patrick Ryan
*Assistant Examiner* — Julian Mercado
(74) *Attorney, Agent, or Firm* — Christie, Parker & Hale, LLP

(57) ABSTRACT

A battery sheath having a radiation layer on its surface and a lithium polymer battery using the sheath are provided. The radiation layer improves radiation performance and mechanical strength of the battery, and also improves the response of a PTC device. The battery sheath comprises a metal layer having first and second surfaces, a radiation layer on the first surface of the metal layer, and a cast polypropylene (CPP) layer on the second surface of the metal layer. The lithium polymer battery has a PTC device electrically connected to a protective circuit module. The PTC device directly contacts the radiation layer of the battery sheath, thereby improving the response of the PTC device.

16 Claims, 12 Drawing Sheets

BATTERY SHEATH HAVING RADIATION LAYER FORMED THEREON AND LITHIUM POLYMER BATTERY USING THE SAME

CROSS REFERENCE TO RELATED APPLICATION

This application claims priority to and the benefit of Korean Patent Application No. 2004-0083275, filed Oct. 18, 2004 in the Korean Intellectual Property Office, the entire content of which is incorporated herein by reference.

FIELD OF THE INVENTION

The present invention relates to a battery sheath comprising a radiation layer and to a lithium polymer battery using the sheath. More particularly, the invention is related to a battery sheath that improves the radiation performance of lithium polymer batteries and the responses of positive temperature coefficient (PTC) devices to increases in temperature.

BACKGROUND OF THE INVENTION

As generally known in the art, a lithium polymer battery is a battery having an electrode assembly comprising a separator positioned between positive and negative electrode plates. The separator performs the role of the electrolyte, namely, it acts as a medium of ion conduction. In addition, the separator acts as a medium for separation. The separator improves ion conductivity and comprises a gel-type polymer electrolyte, which is manufactured by impregnating a polymer with an electrolyte. In addition to improved ion conductivity, the gel-type polymer electrolyte bonds well to electrodes, has good mechanical properties and is easy to manufacture. A polyvinylidene fluoride (PVDF) based electrolyte available from Bellcore Company is one representative gel-type polymer electrolyte and is manufactured by mixing a copolymer of vinylidene fluoride (VDF) and hexafluoropropylene (HFP), a plasticizer and an inorganic additive to form a film, impregnating the film with an electrolyte, and causing the film to gel.

Lithium polymer batteries and lithium ion batteries differ in several respects. First, unlike lithium ion batteries, lithium polymer batteries can have a plate structure and need not be wound. Therefore, lithium polymer batteries can have electrode assemblies that comprise several laminated plates and can be manufactured to have a square structure. Second, in lithium polymer batteries, the electrolyte is injected into a completely integrated cell and rarely leaks out. Third, the plate structure of lithium polymer batteries makes it unnecessary to apply pressure to form the square shape. Therefore, a thin, flexible pouch can be used as the battery sheath, instead of a hard square or cylindrical can.

When a flexible pouch is used as the battery sheath, the thickness is substantially less than the thickness of a battery using a can as the battery sheath. Therefore, more electrode assemblies can be contained within the same volume. This remarkably increases battery capacity. The flexibility of the pouch type battery sheath enables the battery to be easily manufactured in any desired shape, and enables easy mounting of the battery on various electronic appliances. However, pouch type battery sheaths do not radiate heat well, thereby reducing the life of the battery. Specifically, pouch type battery sheaths generally comprise nylon or polyethylene terephthalate (PET) on their surfaces. These materials decrease radiation performance and cannot effectively withstand the heat generated during charging and discharging. Furthermore, the amount of discharge increases as temperature rises, which drastically reduces battery life.

When the temperature of the battery rises above a threshold level, the electrode assembly or the electrolyte decomposes, generating a large amount of gas. This gas generation increases the internal pressure of the battery and causes the battery to swell, seriously decreasing battery reliability.

Lithium polymer batteries can be equipped with positive temperature coefficient (PTC) devices. The resistance of such a PTC device increases relative to temperature, and interrupts charging currents upon increases in temperature. Such a PTC device can be positioned on the protective circuit module itself or on the connection between the protective circuit module and the electrode assembly. The PTC device reduces or interrupts currents flowing through the device when the temperature of the battery increases. Upon reduction or interruption of the currents, heating and temperature increases in the battery generally stop. A portion of the PTC device contacts the battery sheath, enabling it to respond to the temperature of the battery. However, the battery sheath comprises nylon or PET on its surface, which decreases radiation performance as noted above, and heat generated inside the sheath is not quickly transmitted to the PTC device. Accordingly, the PTC device fails to respond quickly to the rising temperature of the battery, seriously decreasing battery reliability.

In addition, conventional battery sheaths have low mechanical strength and are very vulnerable to external impact. For example, a puncture is easily formed if the sheath is pierced with a sharp object such as a needle or nail. Also, the sheath is easily torn if bitten by a pet. Furthermore, penetration of the sheath with a sharp object can cause a short circuit if the object contacts the internal electrode assembly. As a result, the battery may catch fire or explode.

SUMMARY OF THE INVENTION

In one embodiment of the present invention, a battery sheath is provided having improved radiation performance in order to suppress temperature increases in the battery during charging and discharging. The battery sheath comprises a radiation layer on its surface. A positive temperature coefficient (PTC) device contacts the radiation layer, thereby improving the response of the PTC device. The battery sheath has improved mechanical strength, corrosion resistance and resistance to impact.

The battery sheath comprises a metal layer having first and second surfaces, a radiation layer having a predetermined thickness positioned on the first surface of the metal layer, and a cast polypropylene (CPP) layer having a predetermined thickness positioned on the second surface of the metal layer.

According to another embodiment of the present invention, a lithium polymer battery comprises an electrode assembly having a plurality of positive and negative electrode plates separated from each other by a plurality of separators. Positive and negative electrode tabs are connected to the positive and negative electrode plates, respectively, and extend predetermined lengths from the positive and negative electrode plates. A sheath having a radiation layer comprises a container having a cavity for containing the electrode assembly and a cover for covering the cavity of the container.

The battery sheath comprises a radiation layer on its surface. The radiation layer is both an electric insulator and a thermal conductor. The radiation layer maximizes radiation performance of the battery during charging and discharging and increases the life and reliability of the battery.

A PTC device is connected between the protective circuit module and the electrode assembly and directly contacts the radiation layer of the battery sheath. This contact enables the PTC device to quickly detect temperature increases in the battery and interrupt or reduce current flow, thereby remarkably improving battery reliability.

Furthermore, the radiation layer on the battery sheath improves the mechanical strength of the battery and increases resistance to corrosion and impact.

BRIEF DESCRIPTION OF THE DRAWINGS

The above and other features and advantages of the present invention will become more apparent with reference to the following detailed description when considered in conjunction with the accompanying drawings wherein.

DETAILED DESCRIPTION

Figure 1A:
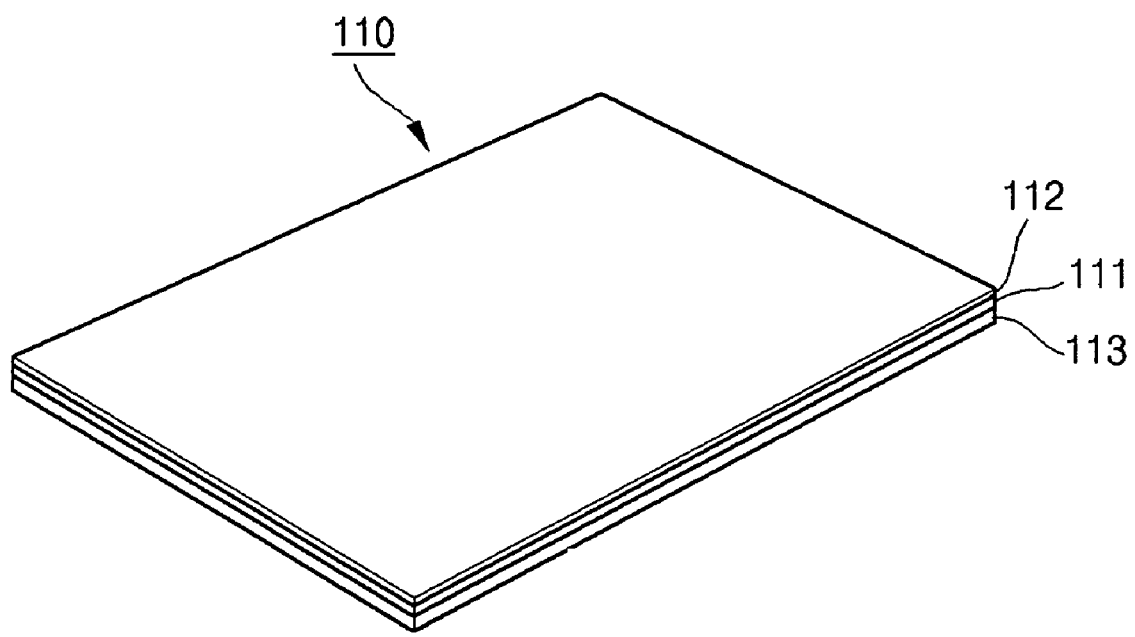
FIG. 1A is a perspective view of a battery sheath according to one embodiment of the present invention.

Exemplary embodiments of the present invention will now be described with reference to the accompanying drawings. In the following description and in the drawings, like reference numerals are used to designate like components in order to avoid repetitive descriptions of same or similar components.

Figure 1B:
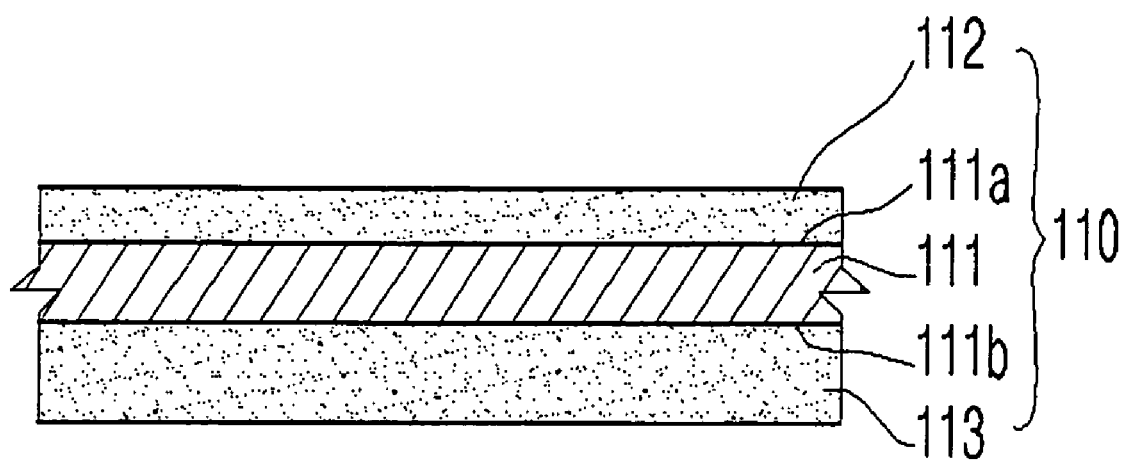
FIG. 1B is a magnified cross-sectional view of the battery sheath of FIG. 1A.

FIG. 1A is a perspective view of a battery sheath according to one embodiment of the present invention. FIG. 1B is a magnified cross-sectional view of the sheath of FIG. 1A. As shown in FIGS. 1A and 1B, a battery sheath 110 comprises a metal layer 111, a radiation layer 112, and a cast polypropylene (CPP) layer 113.

The metal layer 111 has a first surface 111a and a second surface 111b. The metal layer 111 has a thickness ranging from about 20 to about 100 μm. If the thickness of the metal layer 111 is less than about 20 μm, it may be easily fractured or damaged during processing. If the thickness of the metal layer is greater than about 100 μm, it is difficult to process.

The metal layer may comprise a material selected from the group consisting of alloys of iron (Fe), carbon (C), chromium (Cr) and manganese (Mn), alloys of iron (Fe), carbon (C), chromium (Cr) and nickel (N), and aluminum. If the metal layer includes iron, mechanical strength is improved. If the metal layer includes aluminum, radiation performance is improved. When the metal layer 111 includes iron, it may include an alloy comprising from about 84 to about 88.2% iron, 0.5% or less carbon, from about 11 to about 15% chromium, and from about 0.3 to about 0.5% manganese. Alternatively, the alloy may comprise from about 63.7 to about 75.9% iron, from about 0.1 to about 0.3% carbon, from about 12 to about 18% chromium, and from about 7 to about 12% nickel. In addition, the metal layer may comprise a material selected from the group consisting of Korean Industrial Standard (KS) STS 301, STS 304, STS 305, STS 316L, STS 321, Japanese Industrial Standard (JIS) SUS 301, SUS 304, SUS 316L and SUS 321.

The radiation layer 112 is positioned on the first surface 111a of the metal layer 111 by coating or lamination. In one embodiment, the radiation layer has a thickness ranging from about 5 to about 10 μm. If the thickness of the radiation layer 112 is less than about 5 μm, radiation performance is not adequate. If the thickness of the radiation layer 112 is greater than 10 μm, processing of the radiation layer is difficult. The radiation layer may comprise a material that is both an electrical insulator and a thermal conductor. Nonlimiting examples of suitable materials for the radiation layer include thermally conductive polymers, thermally conductive elastomers and thermally conductive silicon elastomers. The radiation layer 112 may also comprise a mixture of ceramic powder and an adhesive resin.

The radiation layer 112 can be formed on the metal layer 111 by coating. After coating, the radiation layer is heat treated at a temperature ranging from about 140 to about 200° C. Alternatively, the radiation layer 112 may be formed into a sheet and laminated to the metal layer 111 with heat.

Nonlimiting examples of ceramic powders for use in the radiation layer 112 include aluminum oxide ($Al_2O_3$), aluminum nitride (AlN), boron nitride (BN), beryllium oxide (BeO), silicon carbide (SiC), and graphite. In one embodiment, the ceramic powder has an average particle size of several microns. The mixture of ceramic powder and adhesive resin comprises from about 5 to about 50 volume % ceramic powder. If the mixture includes less than about 5 volume % ceramic powder, radiation performance is not sufficiently improved. If the mixture includes more than about 50 volume % ceramic powder, the strength of adhesion to the metal layer 111 decreases. When the ceramic powder is present in the mixture within the above range, radiation performance is improved and adhesion to the metal layer remains strong.

The CPP layer 113 is formed on the second surface 111a of the metal layer 111 by coating or lamination. The CPP layer 113 has a thickness ranging from about 30 to about 40 μm. The CPP layer 113 is slightly thicker than the metal layer 111 because an electrode assembly is to be thermally bonded to the CPP layer 113. The CPP layer may also be formed on the first surface 111a of the metal layer 111 and used as the radiation layer.

Figure 2:
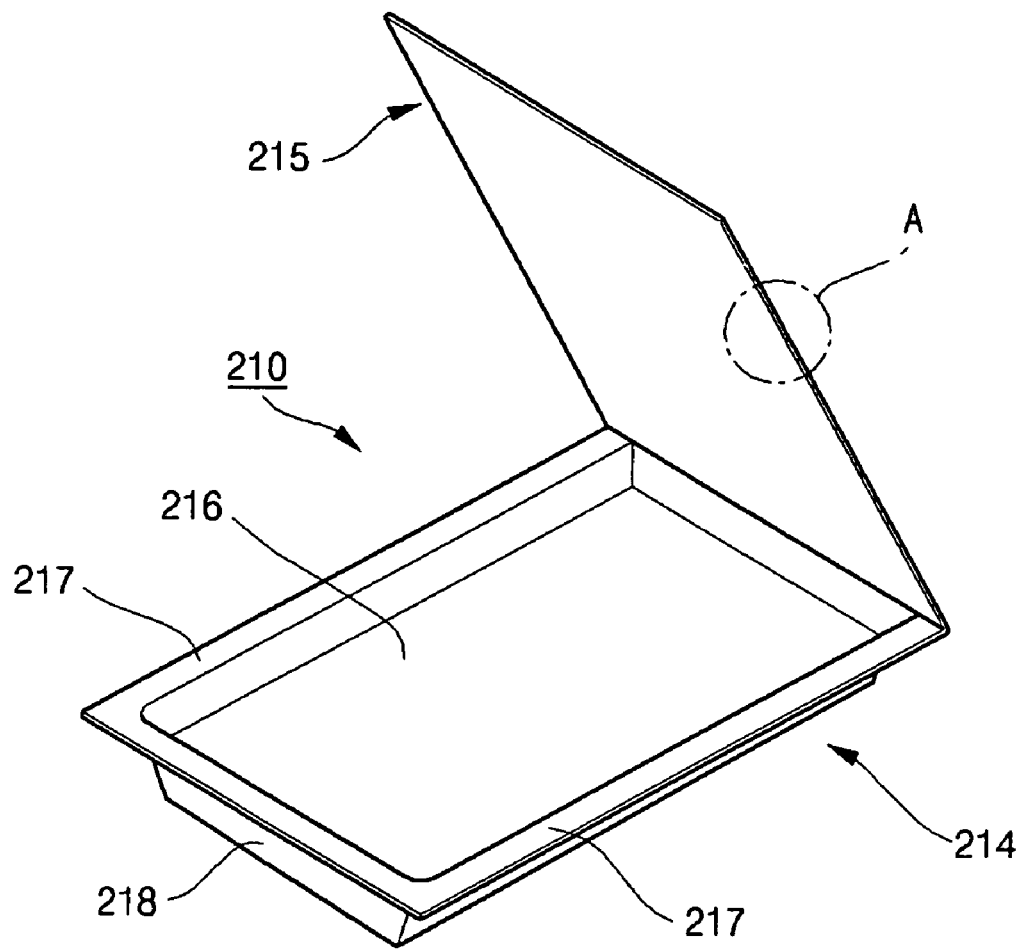
FIG. 2 is a perspective view of a battery sheath according to another embodiment of the present invention.
Figure 2A:
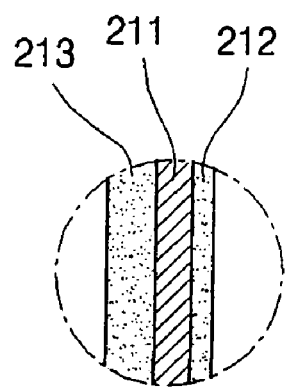
FIG. 2A is a close-up view of region A of the sheath of FIG. 2.

FIG. 2 is a perspective view of a battery sheath 210, which comprises a first region 214 and a second region 215. The first and second regions 214 and 215 are thermally bonded upon sealing the pouch. The first region 214 comprises a cavity 216 sized and shaped to contain an electrode assembly (not shown). The second region 215 is a cover adapted to cover the cavity 216 of the first region 214. The metal layer 211 has a thickness of at least about 20 μm to prevent damage to the sheath during formation of the cavity 216. The first region 214 also comprises a lip 217 around the edge of the cavity 216. The lip 217 is thermally bonded to the CPP layer 213 on the second region 215, and folded against the cavity 216 such that a PTC device 231 and protective circuit module 230 can be positioned in front of the front end 218 of the first region 214, as shown in FIGS. 3A and 3B.

The cavity 216 is formed by contacting the CPP layer 213 with a mold. Therefore, the thickness of the CPP layer 213 is greater than the thickness of metal layer 211, and the thickness of the metal layer is greater than the thickness of the radiation layer 212.

Figure 3A:
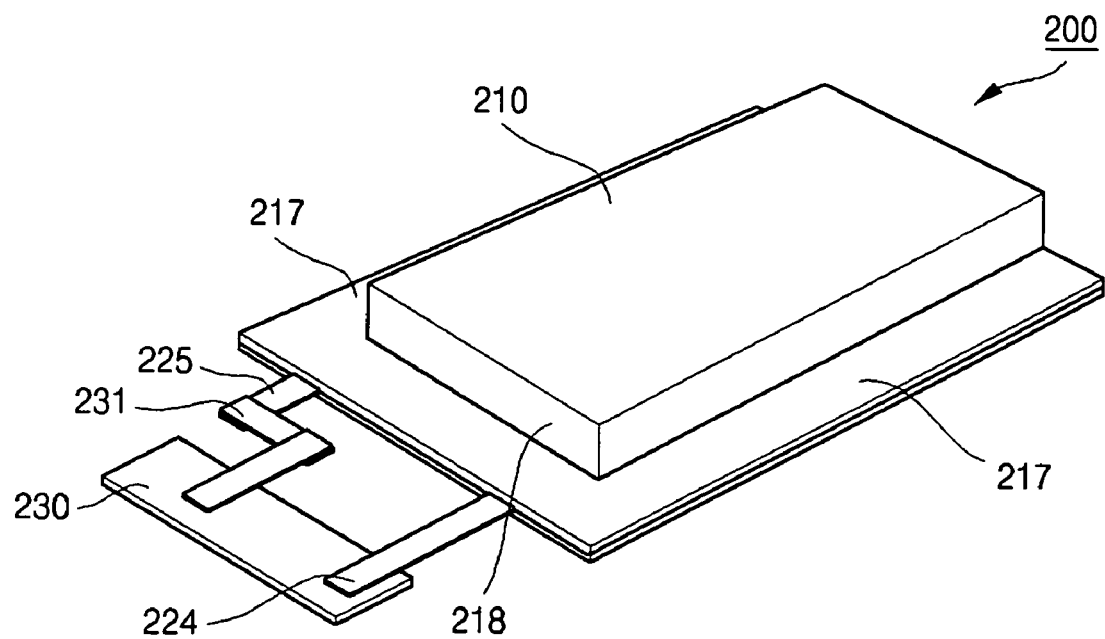
FIG. 3A is a perspective view of a lithium polymer battery according to one embodiment of the present invention.
Figure 3B:
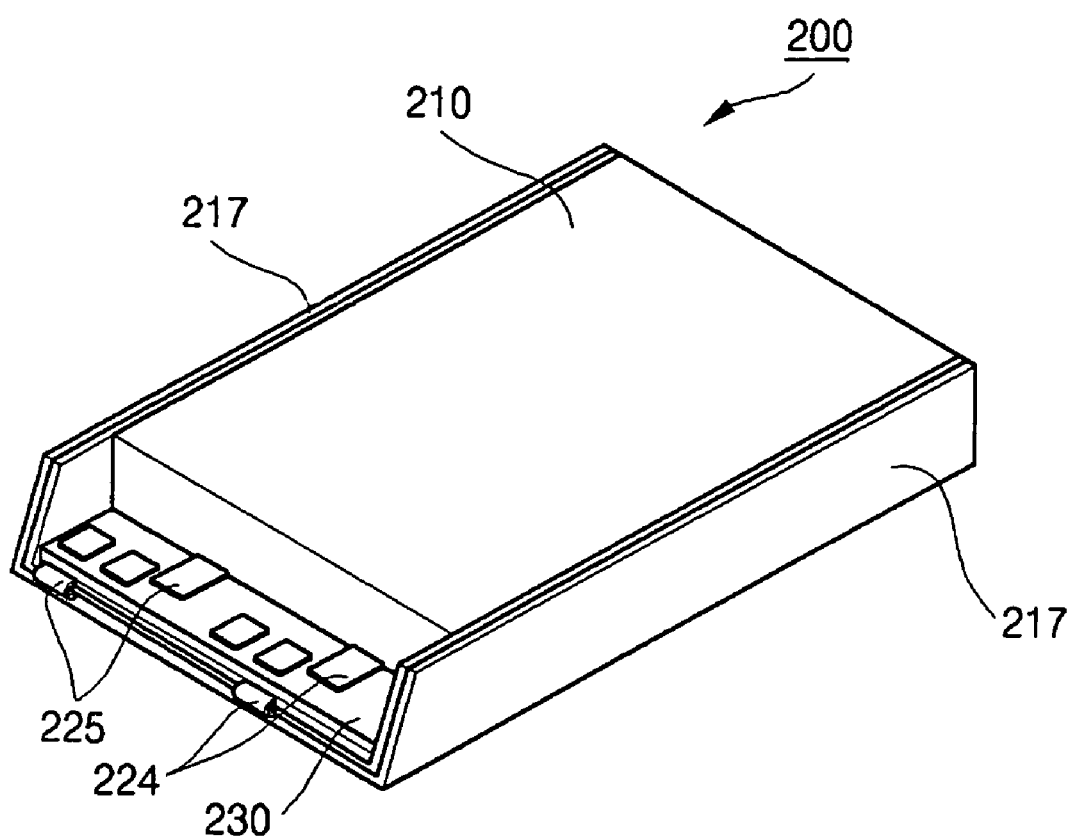
FIG. 3B is a perspective view of the lithium polymer battery of FIG. 3A, shown after bending of the electrode tabs.

FIGS. 3A and 3B illustrate the connection of a PTC device 131 and protective circuit module 230 to the electrode tabs 224 and 225. As shown, the lithium polymer battery includes a battery sheath 210, an electrode assembly contained in the sheath 210, and a protective circuit module 230 electrically connected to the electrode assembly.

Figure 4:
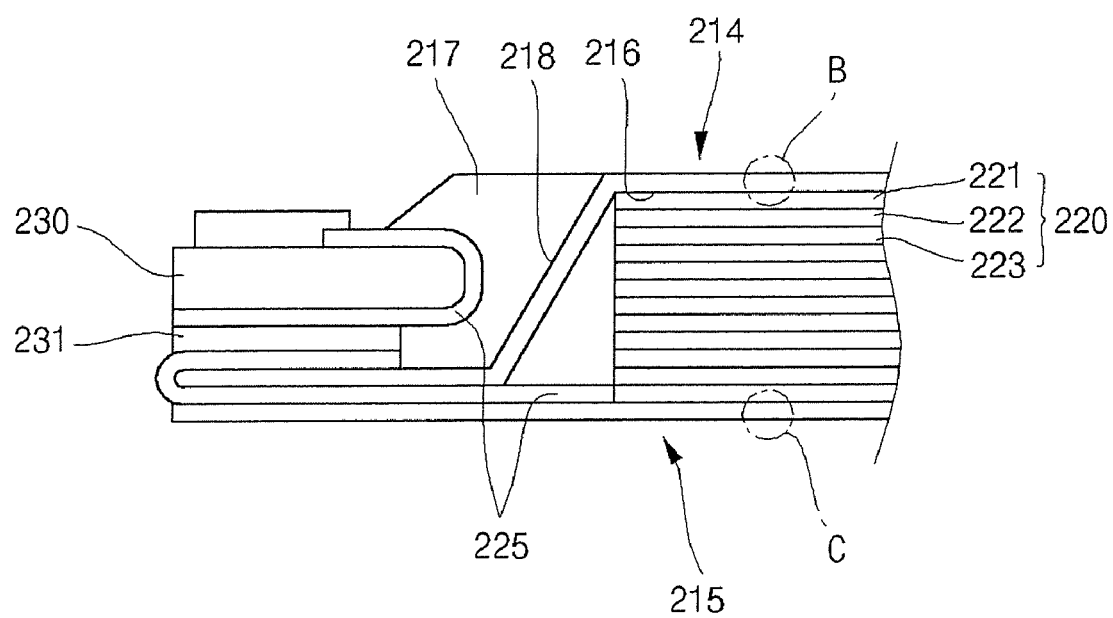
FIG. 4 is a partial side cross-sectional view of the lithium polymer batter of FIG. 3B.
Figure 4A:
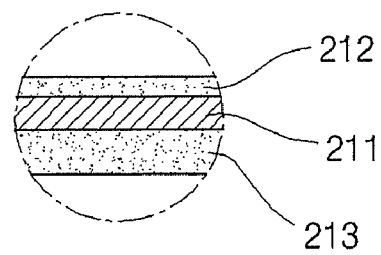
FIG. 4A is a close-up view of region B of the battery of FIG. 3B.
Figure 4B:
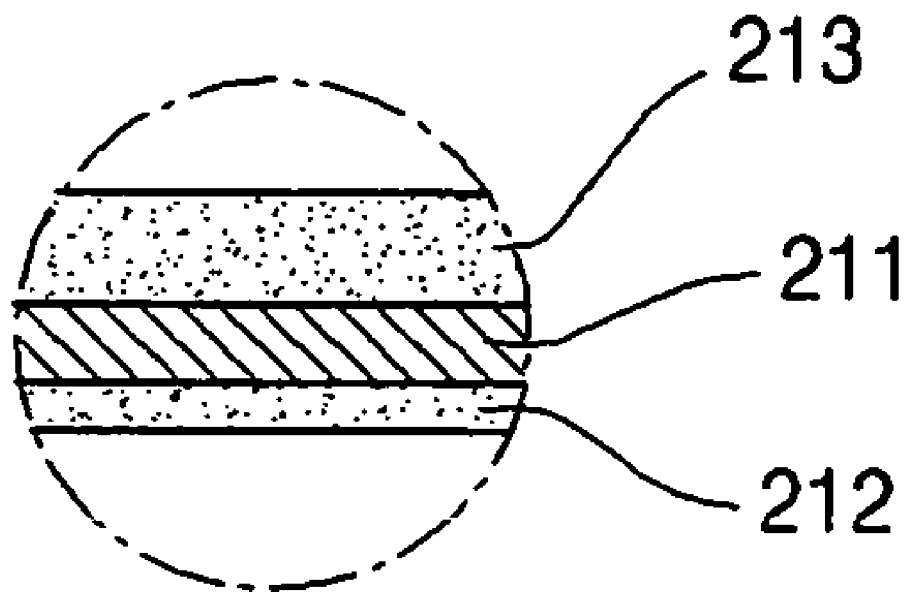
FIG. 4B is a close-up view of region C of the battery of FIG. 3B.

As shown in FIGS. 4, 4A and 4B, the battery sheath 210 comprises a metal layer 211, a radiation layer 212 on a first surface of the metal layer 211 and a CPP layer 213 on a second surface of the metal layer 211. The battery sheath 210 includes a first region 214 having a cavity 216 and a second region 215 for covering the cavity 216. The lip 217 on the outer peripheral edges of the cavity 216 and the portion of the second region 215 that overlaps the lip 217 are thermally bonded after the electrode assembly is placed in the cavity 216. The CPP layers 213 of the first and second regions 214 and 215 are thermally bonded. The thermally bonded portions are then folded against the outer surface of the second region 214 to minimize the size of the sheath. FIG. 3A illustrates a sheath which has been thermally bonded but which has not yet been folded to minimize sheath size. FIG. 3B illustrates a sheath in which the thermally bonded portions have been folded.

The electrode assembly 220, as shown in FIGS. 4, 4A and 4B, comprises a plurality of positive electrode plates 221 and negative electrode plates 223 separated from each other by a plurality of separators 222. Positive and negative electrode tabs 224 and 225, respectively, are attached to the positive and negative electrode plates 221 and 223, respectively, and protrude a predetermined length from the electrode assembly 220. The positive and negative electrode tabs 224 and 225, respectively, further extend outside the battery sheath 210. The positive electrode tab 224 may comprise aluminum and the negative electrode tab may comprise nickel.

The protective circuit module 230 is electrically connected to one of the positive or negative electrode tabs through the PTC device 231. The other of the positive or negative electrode tabs is directly connected to the protective circuit module 230. The PTC device 231 may be positioned directly next to the protective circuit module 230, but it is understood that the PTC device may be placed in any other desirable position.

In one embodiment, after the positive and negative electrode tabs 224 and 225, respectively, are bent, the protective circuit module 230 is positioned in front of the front end 218 of the sheath 210. The positive and negative electrode tabs are bent once to position them against the front end 218 of the sheath 210. The PTC device 231 is positioned on one of the positive and negative electrode tabs 224 and 225, respectively. A portion of the PTC device contacts the front end 218 of the sheath 210 to enable the PTC device to respond to temperature increases. The protective circuit module 230 is positioned on the positive and negative electrode tabs 224 and 225, respectively, and on the PTC device 231. The ends of the positive and negative electrode tabs 224 and 225, respectively, are electrically connected to the protective circuit module 230 despite being bent several times.

The radiation layer 212 is on the outermost surface of the battery sheath 210 and improves radiation performance of the battery. In addition, the radiation layer 212 enables quick transmission of heat to the PTC device 231, thereby improving the response of the PTC device 231 to increases in temperature. Also, the radiation layer 212 has high mechanical strength and excellent resistance to corrosion and impact, thereby improving battery reliability.

Figure 5:
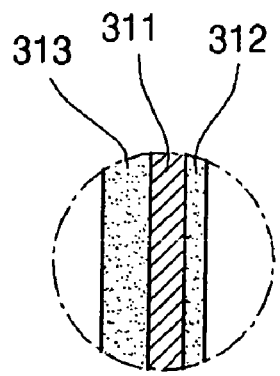
FIG. 5 is a close-up view of region D of the sheath of FIG. 5A.
Figure 5A:
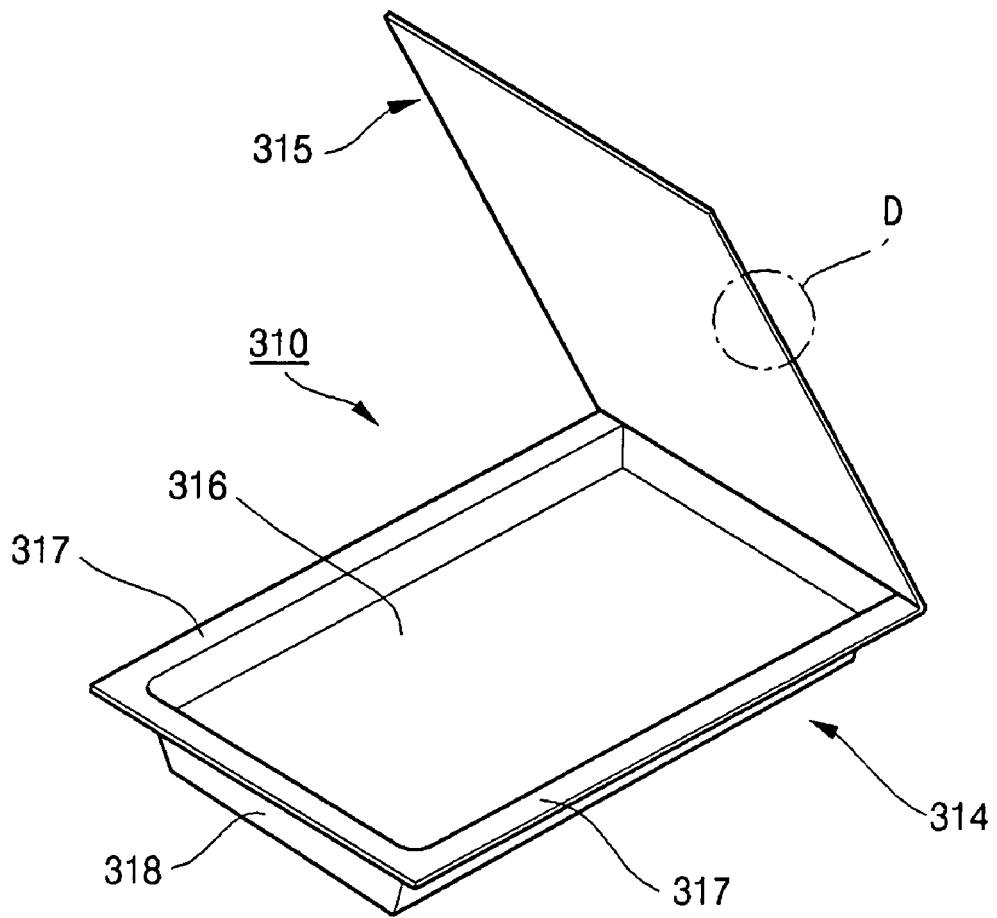
FIG. 5A is a perspective view of the battery sheath according to one embodiment of the present invention, depicting a first step in a method of manufacturing a lithium polymer battery.

FIGS. 5A, 5 and 5B to 5E illustrate various steps in a method for manufacturing a lithium polymer battery according to the present invention. As shown in FIGS. 5a and 5, a battery sheath 310 is first manufactured in a predetermined shape. Specifically, the battery sheath 310 comprises a first region 314 having a cavity 316 sized and shaped to contain an electrode assembly (not shown), and a second region 315 for covering the first region 314. The first region further comprises a lip 317 along the edge of the cavity 316 and a front end 318. A protective circuit module 330 is positioned in front of the front end 318 of the first region 314.

The battery sheath 310 has a layered structure including a metal layer 311, a radiation layer 312 on a first surface of the metal layer 311, and a CPP layer 313 on a second surface of the metal layer 311. The radiation layer 312 is positioned on the outer surface of the battery sheath 310 and improves radiation performance and mechanical strength of the battery. The radiation layer 312 also improves the response of the PTC device 331.

Figure 5B:
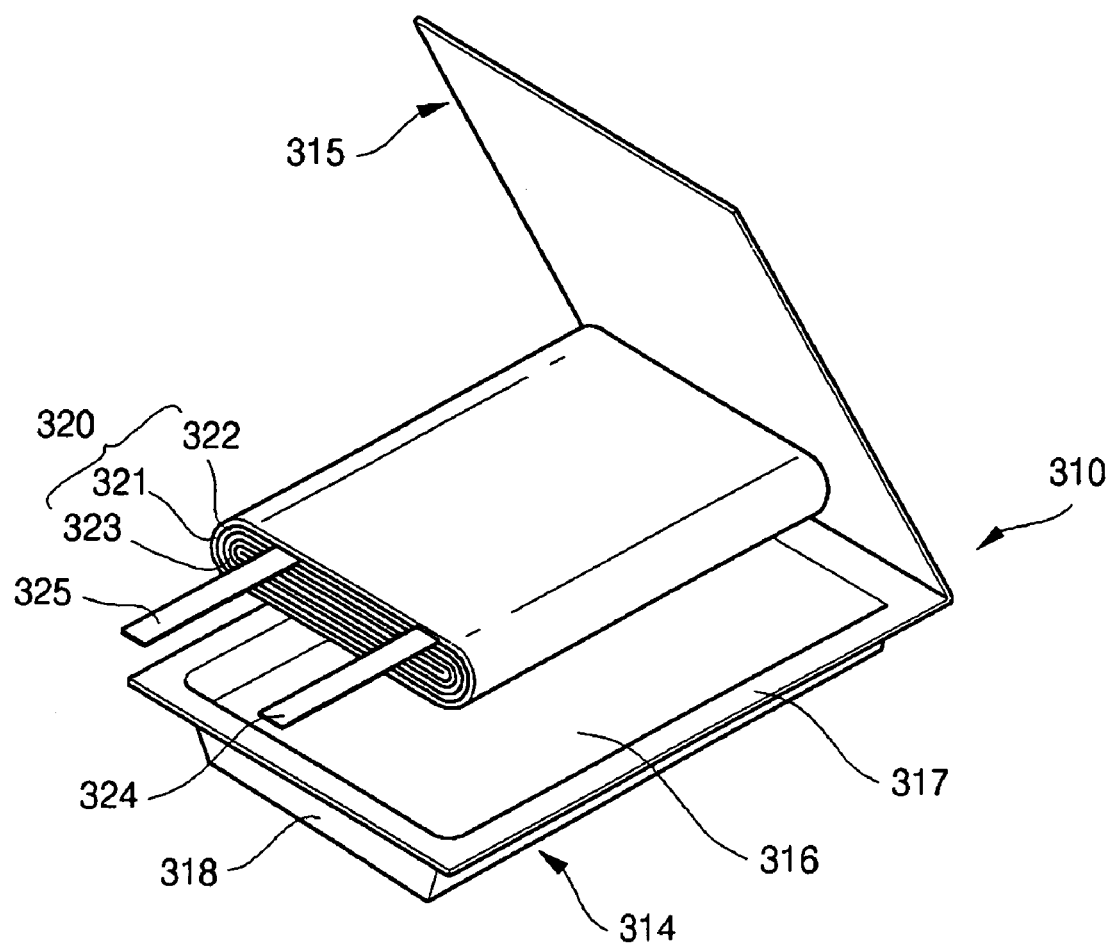
FIG. 5B is a perspective view of the sheath of FIG. 5A, depicting a second step in the method of manufacturing a lithium polymer battery.

An electrode assembly 320 is contained in the cavity 316 of the first region 314 of the battery sheath 310, as shown in FIG. 5B. The electrode assembly 320 comprises a positive electrode plate 321, a negative electrode plate 323 and a separator 322 positioned between the electrode plates. The electrode plates and the separator are wound to form the electrode assembly 320, and positive and negative electrode tabs 324 and 325 are attached to the positive and negative electrode plates 321 and 323, respectively. The electrode tabs 324 and 325 extend a predetermined length from the electrode assembly and extend outside the battery sheath 310.

Figure 5C:
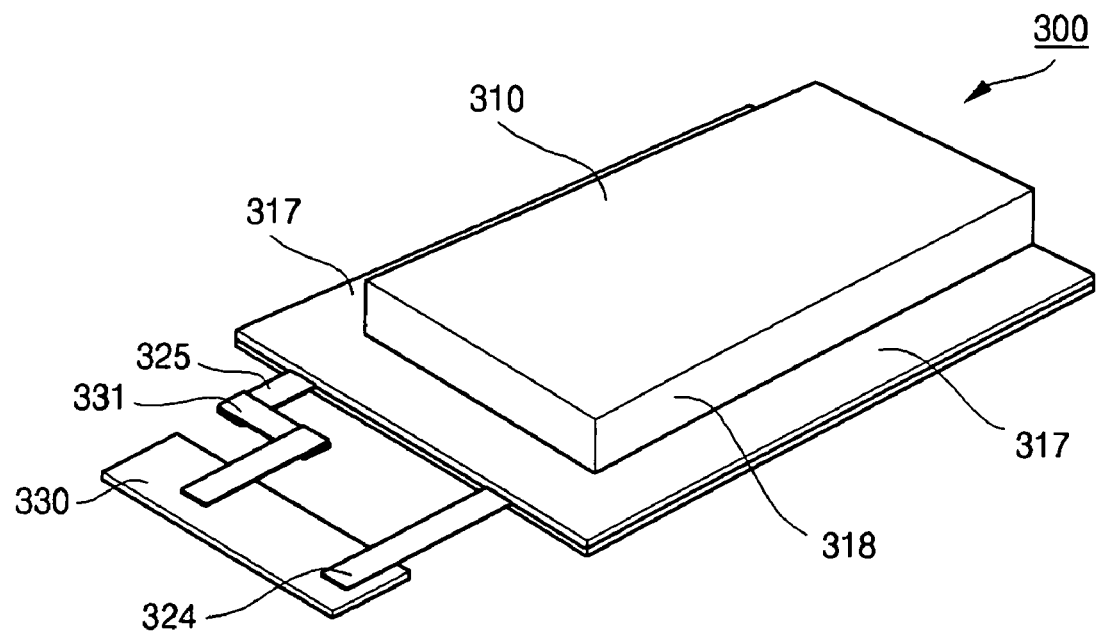
FIG. 5C is a perspective view of the sheath of FIG. 5B, depicting a third step in the method of manufacturing a lithium polymer battery.

A protective circuit module 330 is electrically connected to the positive and negative electrode tabs 324 and 325 of the electrode assembly 320, as shown in FIG. 5C. A PTC device 331 is electrically connected between the protective circuit module 330 and one of the negative electrode tab 325 and positive electrode tab 124. The PTC device 331 quickly detects temperature increases in the battery and reduces or interrupts the current flow accordingly.

Figure 5D:
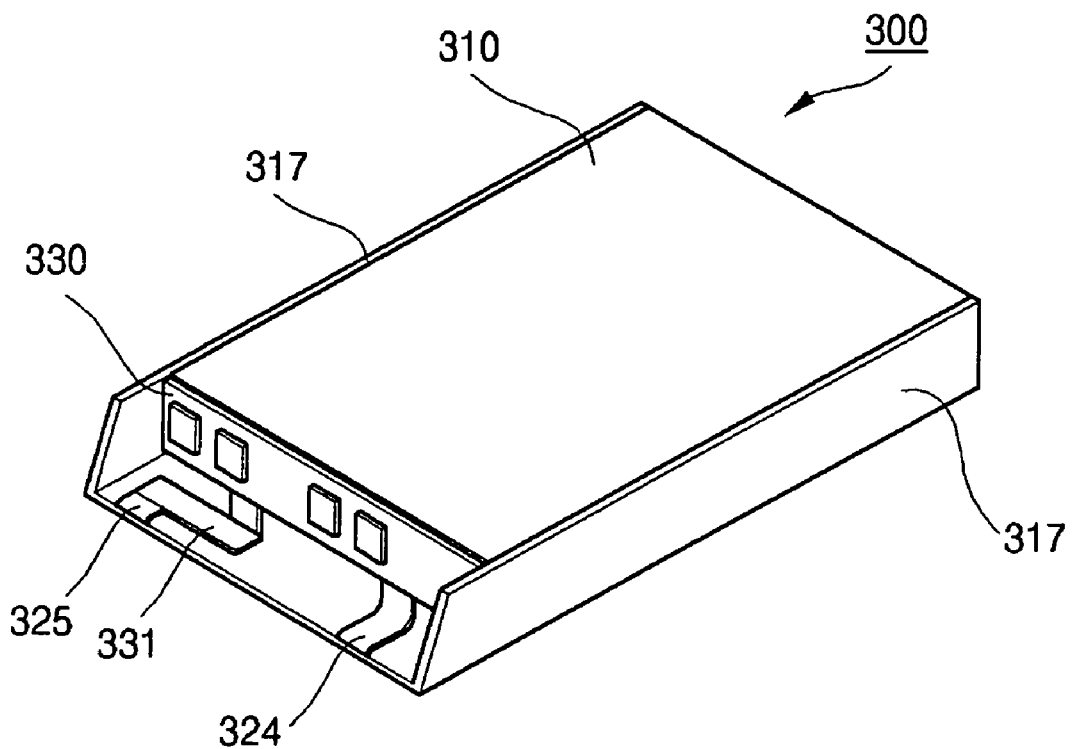
FIG. 5D is a perspective view of the sheath of FIG. 5C, depicting a fourth step in the method of manufacturing a lithium polymer battery.

The protective circuit module 330 is positioned against the front end 318 of the battery sheath 310, as shown in FIG. 5D. The positive and negative electrode tabs 324 and 325 are bent several times to position the protective circuit module 330 against the front end 318. Specifically, the positive and negative electrode tabs 324 and 325 are bent a first time, after which bend, the positive and negative electrode tabs 324 and 325, as well as the PTC device 331, are positioned against the front end 318. A thermally conductive tape (not shown) may be attached to a surface of the front end 318 for enhancing heat transfer to the PTC device 331. The thermally conductive tape may comprise a material that is both an electrical insulator and a thermal conductor. The positive and negative electrode tabs 324 and 325 are then bent a second time to stably position the protective circuit module 330 against the front end 318. A thermally conductive adhesion tape may be positioned between the protective circuit module 330 and the front end 318 for better adhesion.

Figure 5E:
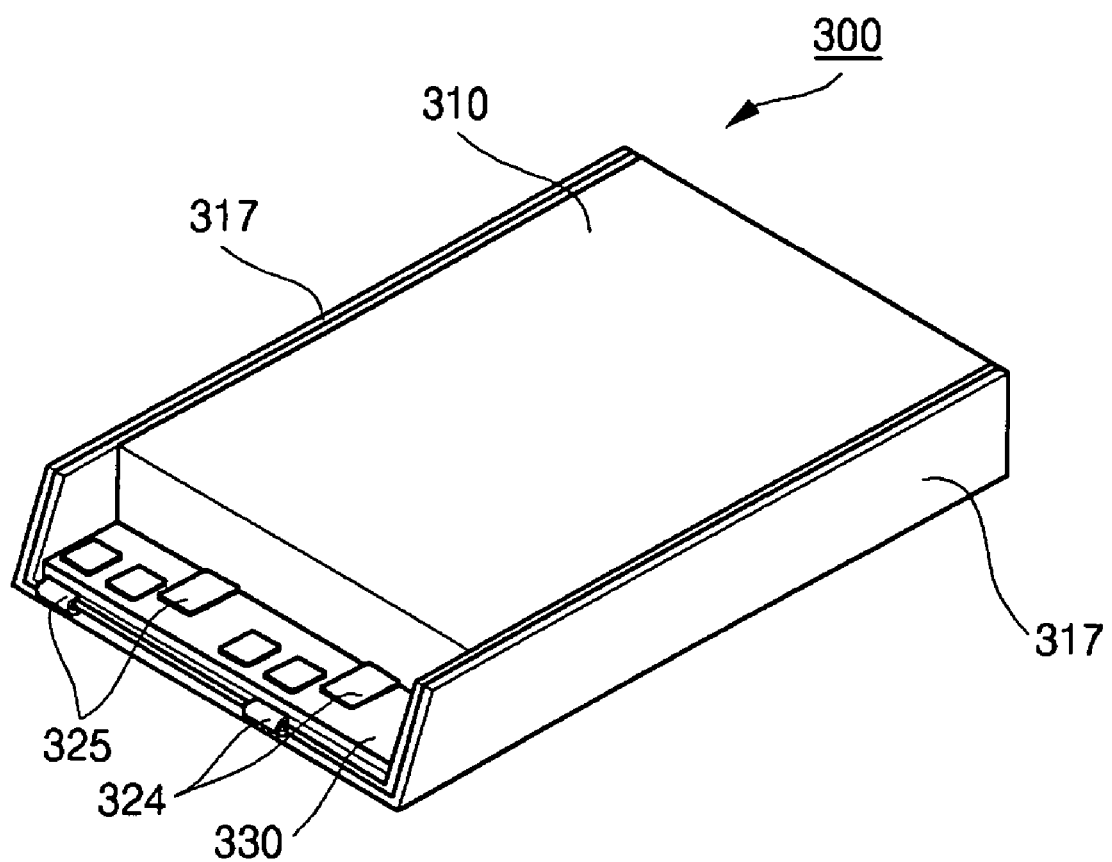
FIG. 5E is a perspective view of the sheath of FIG. 5D, depicting a fifth step in the method manufacturing a lithium polymer battery.

The lip 317 of the battery sheath 310 is then bent toward the cavity 316, as shown in FIG. 5E, thereby completing the lithium polymer battery. The folding of the lip 317 in this manner minimizes the size of the battery 300. The metal layer 311 is exposed to the exterior through the lip 317, but an insulation member may be used seal the lip and prevent exposure of the metal layer 311.

As mentioned above, the battery sheathes lithium polymer batteries according to the present invention comprises radiation layers, which are both electrical insulators and thermal conductors. These radiation layers maximize radiation performance during charging and discharging of the battery and improves battery life and reliability.

The PTC device electrically connected between the electrode assembly and the protective circuit module directly contacts the radiation layer, enabling the PTC device to quickly detect temperature increases in the battery and interrupt or reduce current flow accordingly. This remarkably improves the reliability of the battery.

Furthermore, the radiation layer on the surface of the battery sheath improves mechanical strength and resistance to corrosion and impact.

Exemplary embodiments of the present invention have been described for illustrative purposes only. Those skilled in the art will appreciate that various modifications, additions and substitutions can be made without departing from the spirit and scope of the invention as disclosed in the accompanying claims.

What is claimed is:

1. A battery sheath comprising:
a metal layer having first and second surfaces;
a radiation layer positioned on the first surface of the metal layer, the radiation layer comprising a mixture of ceramic powder and adhesive resin, wherein the ceramic powder comprises a compound selected from the group consisting of silicon carbide (SiC), and graphite; and
a cast polypropylene (CPP) layer positioned on the second surface of the metal layer.

2. The battery sheath as claimed in claim 1, wherein the metal layer comprises a material selected from the group consisting of aluminum, alloys of iron (Fe), carbon (C), chromium (Cr), and manganese (Mn), and alloys of iron (Fe), carbon (C), chromium (Cr), and nickel (Ni).

3. The battery sheath as claimed in claim 1, wherein the radiation layer is an electrical insulator.

4. The battery sheath as claimed in claim 1, wherein the ceramic powder is present in the mixture from about 5 to about 50 volume %.

5. The battery sheath as claimed in claim 1, wherein the radiation layer has a thickness ranging from about 5 to about 10 μm.

6. The battery sheath as claimed in claim 1, further comprising a first region having a cavity adapted to contain an electrode assembly, and a second region adapted to cover the first region.

7. The battery sheath as claimed in claim 6, wherein at least a portion of the first region is thermally bonded to at least a portion of the second region.

8. A lithium polymer battery comprising:
an electrode assembly having at least one positive electrode plate, at least one negative electrode plate, at least one separator positioned between the positive and negative electrode plates, a positive electrode tab attached to the positive electrode plate, and a negative electrode tab attached to the negative electrode plate; and
a sheath having a radiation layer on a surface of the sheath, the sheath comprising a first region having a cavity adapted to contain the electrode assembly and a second region for covering the first region, and the radiation layer comprising a mixture of ceramic powder and adhesive resin, wherein the ceramic powder comprises a compound selected from the group consisting of silicon carbide (SiC), and graphite.

9. The lithium polymer battery as claimed in claim 8, wherein the sheath further comprises:
a metal layer having first and second surfaces; wherein the radiation layer is positioned on the first surface of the metal layer; and
a CPP layer on the second surface of the metal layer.

10. The lithium polymer battery as claimed in claim 9, wherein the metal layer comprises a material selected from the group consisting of aluminum, alloys of iron (Fe), carbon (C), chromium (Cr), and manganese (Mn), and alloys of iron (Fe), carbon (C), chromium (Cr), and nickel (Ni).

11. The lithium polymer battery as claimed in claim 8, wherein the radiation layer is an electrical insulator.

12. The lithium polymer battery as claimed in claim 8, wherein the ceramic powder is present in the mixture in an amount ranging from about 5 to about 50 volume %.

13. The lithium polymer battery as claimed in claim 8, wherein the radiation layer has a thickness ranging from about 5 to about 10 μm.

14. The lithium polymer battery as claimed in claim 8, wherein the positive and negative electrode tabs are electrically connected to a protective circuit module, and a positive temperature coefficient (PTC) device is positioned between the protective circuit module and one of the positive and negative electrode tabs on a surface of the sheath.

15. The lithium polymer battery as claimed in claim 8, wherein at least a portion of the first region of the sheath is thermally bonded to at least a portion of the second region of the sheath.

16. A lithium polymer battery comprising:
an electrode assembly having at least one positive electrode plate, at least one negative electrode plate, at least one separator positioned between the positive and negative electrode plates, a positive electrode tab attached to the positive electrode plate, and a negative electrode tab attached to the negative electrode plate;
a sheath having a radiation layer on a surface of the sheath, the sheath comprising a first region having a cavity adapted to contain the electrode assembly and a second region for covering the first region, and the radiation layer comprising a mixture of ceramic powder and adhesive resin, wherein the ceramic powder is selected from the group consisting of silicon carbide (SiC), and graphite;
a protective circuit module connected to one of the positive and negative electrode tabs; and
a positive temperature coefficient (PTC) device connected to the other of the positive and negative electrode tabs.

* * * * *

UNITED STATES PATENT AND TRADEMARK OFFICE
CERTIFICATE OF CORRECTION

PATENT NO. : 8,021,779 B2
APPLICATION NO. : 11/253053
DATED : September 20, 2011
INVENTOR(S) : Jeong Won Oh et al.

It is certified that error appears in the above-identified patent and that said Letters Patent is hereby corrected as shown below:

On the Title Page

(75) Inventors, line 1.        Delete "Youngin-si (KR)"
                               Insert -- Yongin-si (KR) --

(75) Inventors, line 2.        Delete "Youngin-si (KR)"
                               Insert -- Yongin-si (KR) --

Signed and Sealed this
Thirty-first Day of July, 2012

David J. Kappos
*Director of the United States Patent and Trademark Office*